US009453983B2

(12) United States Patent
Schmitt (10) Patent No.: US 9,453,983 B2
(45) Date of Patent: Sep. 27, 2016

(54) BINOCULAR HAVING A FOLDING BRIDGE (71) Applicant: Carl Zeiss Sports Optics GmbH, Wetzlar (DE)

(72) Inventor: Christoph Schmitt, Biebertal (DE)

(73) Assignee: Carl Zeiss Sports Optics GmbH, Wetzlar (DE)

( * ) Notice: Subject to any disclaimer, the term of this patent is extended or adjusted under 35 U.S.C. 154(b) by 0 days.

(21) Appl. No.: 14/330,946

(22) Filed: Jul. 14, 2014

(65) Prior Publication Data
US 2015/0015944 A1    Jan. 15, 2015

(30) Foreign Application Priority Data

Jul. 12, 2013   (EP) .................................. 13176261

(51) Int. Cl.
*G02B 23/00*   (2006.01)
*G02B 7/12*    (2006.01)
*G02B 7/06*    (2006.01)

(52) U.S. Cl.
CPC .. *G02B 7/12* (2013.01); *G02B 7/06* (2013.01)

(58) Field of Classification Search
CPC ...... G02B 23/00; G02B 23/16; G02B 23/18; G02B 23/20; G02B 25/004
USPC ....... 359/407, 408, 409, 411, 413, 414, 415, 359/416, 417, 418, 419, 421, 429, 430, 480, 359/481
See application file for complete search history.

(56) References Cited

U.S. PATENT DOCUMENTS

| 4,262,990 A * | 4/1981 | Kamakura | ............. G02B 23/00 359/422 |
| 4,396,257 A * | 8/1983 | Nakamura | ............... G02B 7/04 359/414 |
| 4,630,901 A | 12/1986 | Altenheiner et al. | |
| 4,750,823 A * | 6/1988 | Riedl | ..................... G02B 23/18 359/414 |
| 7,372,637 B2 | 5/2008 | Miyaji | |

FOREIGN PATENT DOCUMENTS

DE         27 17 573 A1    3/1978

OTHER PUBLICATIONS

English translation of the Extended European Search Report dated Dec. 2, 2013 of parallel European application 13176261.9-1562.

* cited by examiner

*Primary Examiner* — Stephone B Allen
*Assistant Examiner* — Rahman Abdur
(74) *Attorney, Agent, or Firm* — Walter Ottesen, P.A.

(57) ABSTRACT

A binocular has a folding bridge for adapting the distance between the eyepieces to the interpupillary distance of the eyes of the user. A synchronous focusing of the two telescopes is brought about via a differential gear assembly which drives respective spindle drives for corresponding ones of the two telescopes. The conversion of the rotational movement into an axial linear displacement of the focusing element of the optics occurs only at the end of the corresponding spindle drive.

16 Claims, 6 Drawing Sheets

BINOCULAR HAVING A FOLDING BRIDGE

CROSS REFERENCE TO RELATED APPLICATION

This application claims priority of European patent application no. 13176261.9, filed Jul. 12, 2013, the entire content of which is incorporated herein by reference.

FIELD OF THE INVENTION

The invention relates to a binocular (often referred to in plural as binoculars) with a folding bridge for adapting the distance between the eyepieces to the distance between the user's eyes generally, and in particular to such a binocular having a central drive for focusing.

BACKGROUND OF THE INVENTION

Figure 1:
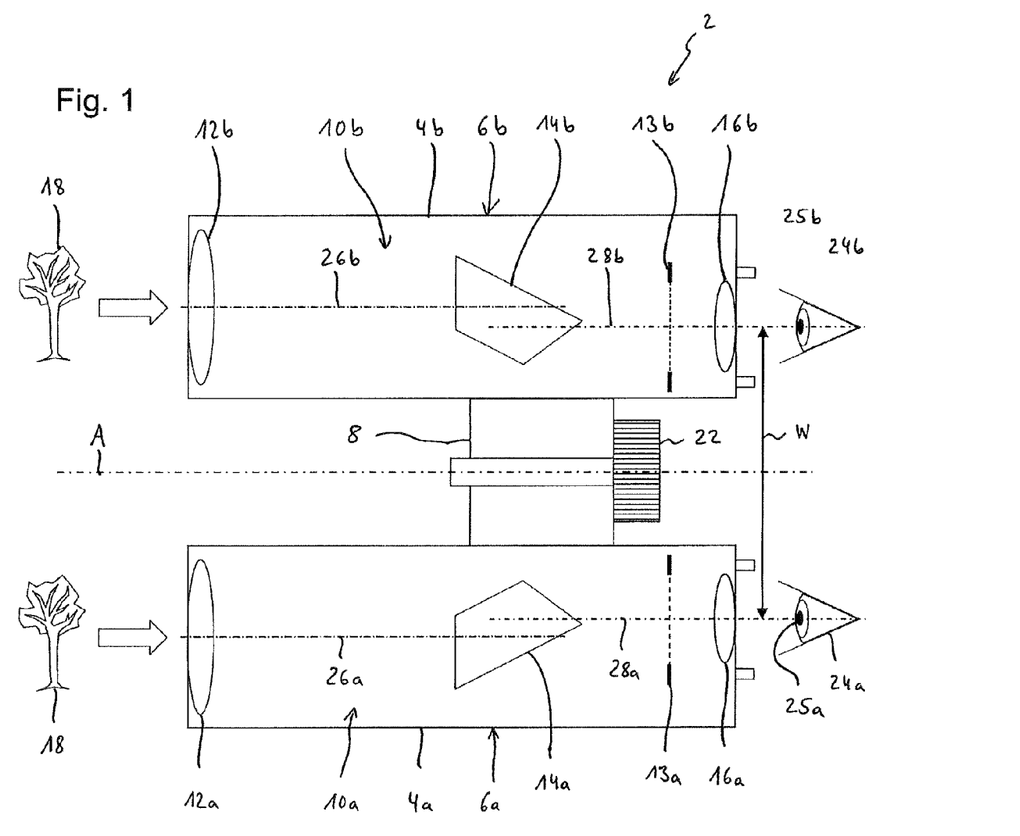
FIG. 1 shows a general schematic of a binocular.

FIG. 1 is a schematic view of the general design of a binocular 2. The latter are made of two housing halves or tubes (4a, 4b) which are arranged parallel to one another and each contain an optical system with the result that a left-hand and a right-hand telescope (6a, 6b) are formed, and a bridge 8 which connects the two housing halves.

The respective optical system (10a, 10b) is made of at least one objective lens unit (12a, 12b), a prism system (14a, 14b) and an eyepiece (16a, 16b). An optical axis is defined in each case by the objective lens unit and by the eyepiece.

The objective lens unit (12a, 12b) can be made of a plurality of individual lenses or cemented elements.

For the purpose of focusing an object 18 which is being viewed through the binocular 2, in each case at least one optical element of the left-hand and right-hand telescopes (6a, 6b) is displaced axially. For this purpose, for example the eyepiece (16a, 16b) can axially displace the entire objective lens unit (12a, 12b) or a lens or lens group which can be a part of the objective lens unit. The latter lens or lens group is typically arranged between the fixed objective lenses and the prism system (14a, 14b) and is typically referred to as a focusing lens. For the purpose of focusing, in one specific design a rotary knob 22 is arranged on a central axis A with which synchronous axial displacement of the left-hand and right-hand focusing lenses is driven. This arrangement is also referred to as a central drive.

The objective lens unit (12a, 12b) can produce a real image which is inverted relative to the viewed object 18, in an image plane which is assigned to the objective lens unit (12a, 12b). For the purpose of image erection the prism system (14a, 14b) can be constructed, for example, according to Abbé-König, Schmidt-Pechan, Uppendahl, Porro or some other prism system variant. Via the prism system (14a, 14b), the image which is inverted is placed in an upright position again and is presented in a new image plane, the intermediate image plane.

A field diaphragm (13a, 13b) which sharply delineates the field of vision can be located in the intermediate image plane. The eyepiece (16a, 16b) can be used to represent the image of the intermediate image plane at any desired distance, for example into infinity or an apparent distance of one meter.

A beam direction is typically defined by the sequence object 18—object lens unit (12a, 12b)—prism system (14a, 14b)—eyepiece (16a, 16b)—eye (24a, 24b).

The optical axis (26a, 26b) of the objective lens unit can have a lateral offset as a result of a beam offset owing to the prism system (14a, 14b) with respect to the optical axis (28a, 28b) of the eyepiece (16a, 16b).

In order to adapt the lateral distance between the eyepieces to the interval distance between the pupils (25a, 25b) of the user's eyes, the so-called distance W between the eyes, the bridge 8 of the binocular 2 can be embodied as what is referred to as a folding bridge 8. In the binocular 2 with a folding bridge 8 the two housing halves (4a, 4b) and therefore the entire optical system (10a, 10b) which is arranged in the left-hand and right-hand housing halves, including all the optical elements (12a, 14a, 16a, 12b, 14b, 16b) of the left-hand and right-hand telescopes (6a, 6b) are joined to one another in a pivotable fashion via a joint 30 of the folding bridge 8. As a result, the distance between the eyepieces can be adapted to the individual distance W between the eyes by the user via the pivoting movement of the two housing halves (4a, 4b). A typical interval for the adjustment of the distance between the eyepieces can be in the range from approximately 55 mm to 75 mm.

The aperture diaphragm can be formed either by a mount of an optical element or can be defined by a separate diaphragm. It can be imaged into a plane by the rest of the optical system which follows in the beam direction, said plane being located behind the eyepiece in the beam direction, typically at a distance of 5 to 25 mm from said eyepiece. This plane is typically referred to as the plane of the exit pupil.

A different type of defective vision of the user's two eyes can be taken into account via a diopter compensation. For this purpose, for example the relative axial positions of the focusing lenses of the two telescopes (6a, 6b) relative to one another can be adjusted by the user. Another possibility is to be able to modify the axial positions of the two eyepieces (16a, 16b) relative to one another, for example by adjusting just one of the two eyepieces.

In order to protect the user against lateral incident light, eye cups which can be pulled out, turned out or folded over can be provided on the eyepieces (16a, 16b).

Furthermore, binocular 2 can contain further optical components which serve, for example, to stabilize an image, input beams or output beams or for photographic purposes. Likewise, electronic components, operator control elements or energy stores may be provided which are necessary for the specified purposes.

Securing devices, to which, for example, a strap for carrying can be attached, can usually be located on the side of the binocular 2.

In the case of a binocular with a central drive and diopter compensation on one of the two eyepieces the user usually only sets the diopter compensation once at the start in order to adapt the relative focusing of the two telescopes (6a, 6b) to the relative refractive power of his or her two eyes (24a, 24b). Afterwards, the user can then use the central focusing drive element which is formed here as a rotary knob 22 to focus the two telescopes (6a, 6b) synchronously with the changing distance of objects 18 to be observed. In the case of binocular 2 with a folding bridge 8 the focusing drive is one of the critical parts. Care should be taken to ensure that the diopter compensation does not unintentionally adjust itself during use, in particular during pivoting or "folding" of the folding bridge 8.

A binocular with a focusing drive which meets this requirement is described in U.S. Pat. No. 4,630,901. Here, an objective-lens-unit-side adjustment knob drives a central driver disk which is guided linearly in a guide pin. Two push rods, which engage in the objective lens unit mount are coupled into the driver disk.

Although such focusing drives typically meet the requirements which are made, the simplicity, robustness and lever ratio of pushrod mechanisms or lever mechanisms basically leave room for improvement. It should also be ensured that sticking of the focusing drive can be effectively prevented. In addition, many mechanisms take up a relatively large amount of space.

SUMMARY OF THE INVENTION

It is an object of the invention to provide a binocular with a folding bridge which has a precise, reliable and space-saving drive mechanism for synchronous focusing of the two telescopes, wherein the drive mechanism does not have any unfavorable lever ratios and wherein sticking of the drive mechanism can be effectively avoided.

A further aspect of the invention is to provide a binocular with a folding bridge whose drive mechanism does not adjust itself for the synchronous focusing of the two telescopes, in particular not relative to one anther, during the pivoting or "folding" of the folding bridge.

The object of the invention is achieved by a binocular for the left and right eye of a user having an interpupillary distance (W) between the left and right eye. The binocular includes: a left telescope having first optical elements with adjustable focusing for the left eye of the user; a right telescope having second optical elements with adjustable focusing for the right eye of the user; a folding bridge having a joint pivotally interconnecting the left telescope and the right telescope so as to cause a pivot movement of the folding bridge to adapt the distance between the left telescope and the right telescope to the interpupillary distance (W) of the user; a focusing gear mechanism configured to synchronously focus the left telescope and the right telescope; a common focusing drive element configured to be operated by the user to drive a focusing of the left telescope and the right telescope via the focusing gear mechanism; and, the focusing gear mechanism including a differential gear assembly.

The binocular according to the invention has a folding bridge for adapting the distance between the eyepieces to the distance between the eyes (interpupillary distance) of the user and includes a left-hand telescope with a left-hand housing half in which the optical elements of the left-hand telescope are housed, and a right-hand telescope with a right-hand housing half in which the optical elements of the right-hand telescope are housed. The left-hand and the right-hand telescopes each have an adjustable focusing means in order to bring into focus the object to be viewed for both eyes.

The folding bridge has a joint via which the left-hand and right-hand telescopes are connected to one another in such a way that they can be pivoted relative to one another, such that the user can adapt the distance between the left-hand and right-hand eyepieces of the left-hand and right-hand telescope to the individual distance between his or her eyes via the pivoting movement ("folding") of the folding bridge.

The drive mechanism of the focusing means of the two telescopes has a focusing gear mechanism via which the focusing means of the two telescopes are driven synchronously.

The binocular includes a common focusing drive element (for both telescopes) which can be activated manually by the user and via which the user drives the focusing gear mechanism, which then in turn drives the focusing of the two telescopes synchronously. The focusing drive element is, in particular, a central manual, for example objective-lens-unit-side, rotary knob.

According to the invention, the focusing gear mechanism includes a differential gear assembly whose drive shaft is driven directly or indirectly by the common focusing drive element. The first drive of the differential gear assembly drives the focusing means of the left-hand telescope directly or indirectly, and the second drive of the differential gear assembly drives the focusing means of the right-hand telescope directly or indirectly. In other words, the drive, brought about by the user via the central rotary knob, using the differential gear assembly which is embodied as a toothed gear mechanism, is distributed synchronously to the focusing mechanism of the left-hand and right-hand telescopes.

This drive mechanism for the synchronous focusing of the two telescopes on both sides of the binocular is advantageously precise and reliable. In particular, the drive mechanism can be embodied so as to be smooth-running with minimal play. In addition, unfavorable lever ratios and sticking of the drive mechanism can be effectively avoided.

It is a further advantage that during the pivoting or "folding" of the folding bridge, the focusing means of the two telescopes do not adjust themselves, despite the use of a focusing gear mechanism which is embodied as a toothed gear mechanism, with the result that neither the diopter compensation, once it has been set, between the user's two eyes nor the synchronously set focusing of the two telescopes is undesirably adjusted. For this purpose, the self-locking within the drive mechanism is set in such a way that certain gearwheels of the focusing gear mechanism will run on the other during the folding without adjusting the focusing of the left-hand and right-hand telescopes.

The common focusing drive element which is preferably embodied as a single central manual rotary knob drives the drive shaft of the differential gear assembly directly or indirectly, with the result that by turning the one manual rotary knob via the differential gear assembly the focusing means of the left-hand and right-hand telescopes are driven jointly and synchronously.

The drive of the focusing on both sides is therefore embodied, in particular, as a central drive. The manual rotary knob is arranged here on the folding bridge between the left-hand and right-hand telescopes and the rotational axis of the manual rotary knob runs coaxially with the pivoting axis of the joint of the folding bridge. This has the advantage of symmetrical arrangement which permits equally comfortable operator control both by left-handed and right-handed people.

The differential gear assembly is embodied, in particular, as a planetary gear mechanism and includes a first and a second rotating gearwheel and a first and a second sun gearwheel which are in meshing engagement with the first and second rotating gearwheels, respectively. The first and second rotating gearwheels are preferably driven by the central rotary knob, and the driver of the first sun gearwheel drives the focusing means of the left-hand telescope, and the drive of the second sun gearwheel drives the focusing means of the right-hand telescope. The differential gear assembly is preferably embodied as a spur gear mechanism.

Such a gear mechanism is advantageous since it can be embodied in a very reliable, smooth-running fashion with minimal play and sticking within the gear mechanism is virtually ruled out. On the other hand, such a gear mechanism can be installed in a space saving fashion in parts of the mechanism, for example in the rotary knob, which are present in any case.

A particularly symmetrical and compact design can be achieved if the first and second sun gearwheels are arranged coaxially with respect to one another, coaxially with respect to the joint and/or coaxially with respect to the rotary knob.

The folding bridge includes, in particular, a cross-plate which runs transversely with respect to the optical axis and which connects the left-hand and right-hand telescopes, or their housing halves, to one another. The cross-plate is of two-part configuration and is made of a left-hand and right-hand half which are connected to one another with the joint in a pivotable fashion.

The two-part cross-plate therefore forms a pivotable but otherwise stable connecting strut between the two housing halves. Further cross-plates or bending bridges between the two telescopes are not ruled out, for example an eyepiece-side and an objective-lens-unit-side folding bridge, for example with a reach-through, can be present.

Furthermore it is symmetrical and space-saving to arrange the differential gear assembly directly on the joint of the folding bridge or directly on the two-part cross-plate. In this context, at least one shaft of the focusing gear mechanism can extend coaxially through a hollow shaft of the joint.

According to one preferred embodiment of the invention, the drive mechanism for focusing includes a left-hand and right-hand spindle drive which are driven in rotation directly or indirectly by the associated output of the differential gear assembly. The left-hand and right-hand spindle drives then each separately convert the rotational movement of the differential gear assembly drive into a linear displacement. Via the linear displacement which is generated in this manner, the left-hand spindle drive then drives at least one of the optical elements of the left-hand telescope, and the right-hand spindle drive drives at least one of the optical elements of the right-hand telescope, in order to bring about the synchronous focusing of the left-hand and right-hand telescopes.

The relatively late conversion of the rotational movement generated using the rotary knob into the linear displacement can advantageously ensure high precision and low play. In addition, Z-shaped push rods and lever rods with unfavorable lever ratios can be avoided. Furthermore, the spindle drive can have sufficient self-locking which avoids undesired adjustment of the focusing means of the two telescopes, even relative to one another, during the pivoting of the folding bridge.

In particular, the spindle drive of the left-hand and right-hand telescopes includes a left-hand or right-hand threaded rod which extends in the housing half of the left-hand or right-hand telescope and is rotatably mounted, for example, on the left-hand or right-hand half of the cross-plate. As a result, the compact design, the precision and the low play of the focusing mechanism can advantageously be promoted further.

According to one preferred embodiment of the invention, the focusing gear mechanism includes a first and second or left-hand and right-hand downstep gear mechanism which is respectively driven by the first or second output of the differential gear assembly. The left-hand and right-hand spindle drives are then respectively driven by the left-hand and right-hand downstep gear mechanisms.

As a result, the overall downstep ratio between the rotary knob and the linear displacement of the optics can be adapted and therefore fine and precise setting of focusing means of the two telescopes can be achieved.

The left-hand and right-hand downstep gear mechanisms are preferably arranged laterally offset with respect to one another on the respective half of the cross-plate which is also space-saving.

According to one preferred embodiment of the invention, the rotary knob and the differential gear assembly are arranged axially, that is, with respect to the direction of the optical axis, on a first side of the folding bridge or of the cross-plate, preferably on the objective lens unit side. Furthermore, the first and second downstep gear mechanisms are preferably arranged on the axially opposite second side of the folding bridge or of the cross-plate, that is, preferably on the eyepiece side, with the result that the focusing gear mechanism is located in each case partially on both axial sides of the folding bridge and at least one shaft of the focusing gear mechanism extends through the cross-plate. This can also advantageously permit a particularly compact design.

The first and second sun gearwheels preferably include a respective first or second output shaft, wherein the two output shafts extend coaxially with respect to one another and/or coaxially with respect to the pivoting axis of the joint. In particular, the first and second output shafts extend axially in the same direction. For this purpose, one of the two output shafts is embodied as a hollow shaft and the other of the two output shafts runs coaxially in the hollow shaft. Both output shafts which are embodied in this manner can then extend coaxially through the joint of the folding bridge which is embodied as a hollow joint. This arrangement also permits a symmetrical and compact design.

The common rotary knob is preferably embodied in hollow fashion in the manner of a hat and houses in its interior at least part of the differential gear assembly. The rotating gearwheels are preferably guided along by a differential gear assembly cage in order to drive the sun gearwheels which are also housed by the differential gear assembly cage, which is compact and reliable.

According to a further preferred embodiment of the invention, the rotary knob is arranged axially on a first side of the folding bridge or of the cross-plate, preferably on the objective lens unit side, and the differential gear assembly and/or the first and second downstep gear mechanisms are arranged on the axially opposite second side of the folding bridge or cross-plate, preferably on the eyepiece side. In this embodiment, the differential gear assembly cage can be arranged inside the sun gearwheels, which also permits a compact design.

BRIEF DESCRIPTION OF THE DRAWINGS

The invention will now be described with reference to the drawings wherein.

DESCRIPTION OF THE PREFERRED EMBODIMENTS OF THE INVENTION

FIG. 1 shows a schematic of the basic design of a binocular with a folding bridge. The basic design of a binocular with a folding bridge is already described above to which reference can be made here.

Figure 2:
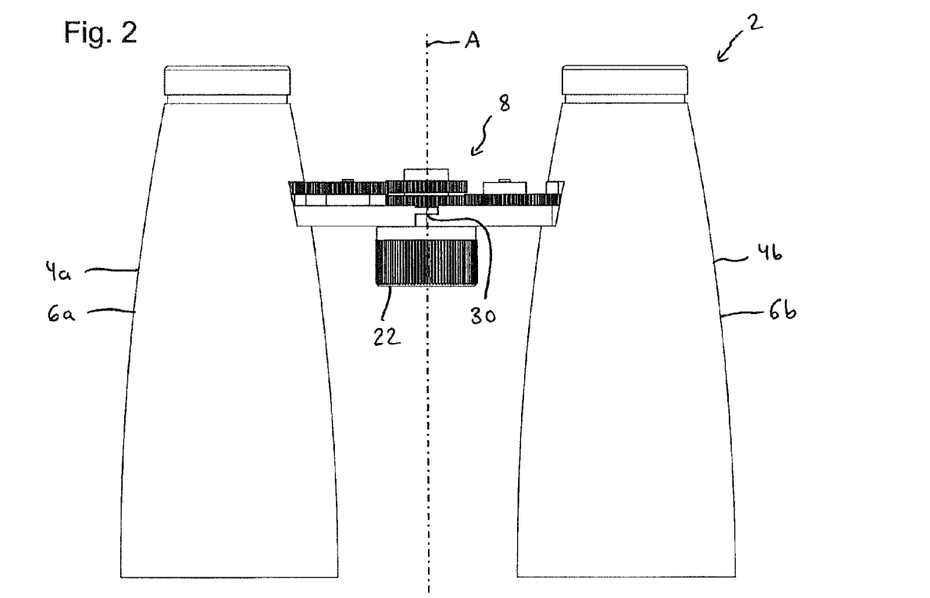
FIG. 2 shows a partially opened view of a binocular according to a first embodiment of the invention.

FIG. 2 shows a first embodiment of a binocular 2 with a left-hand and right-hand telescope (6a, 6b), including a left-hand and right-hand housing half in the form of what are referred to as tubes (4a, 4b) which, as in the example shown, do not necessarily need to be cylindrical. The two tubes (4a, 4b) are connected to one another via a folding bridge 8 with a pivotable or foldable joint 30 so that the user can adapt the distance $d_0$ between the eyepieces individually to the distance W between the eyes via a pivoting or folding movement of the two telescopes (6a, 6b) in relation to one another. The folding bridge 8 is illustrated in an open position in FIG. 2, that is the housing paneling of the folding bridge 8 is excluded in order to allow the interior structure to be recognized better. Depending on the stability requirements and embodiment of the binocular 2, the folding bridge 8 can have a more or less large extent, or, for example, a further objective-lens-unit-side folding bridge can also be present.

Figure 3:
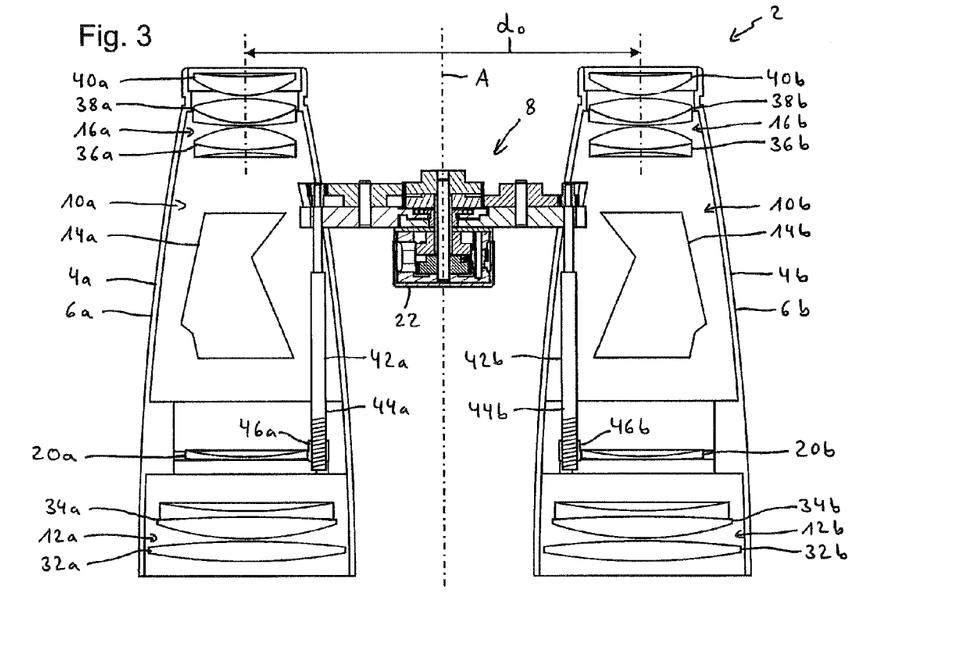
FIG. 3 shows a schematic cross section through the binocular of FIG. 2.

Referring to FIG. 3, each of the two telescopes (6a, 6b) has an objective lens unit (12a, 12b), a focusing lens (20a, 20b) which is arranged downstream of the objective lens unit (12a, 12b) in the beam direction, a prism system (14a, 14b) which is arranged downstream of the focusing lens (20a, 20b) and an eyepiece (16a, 16b) which is arranged downstream of the prism system (14a, 14b) in the beam direction. In the embodiment shown, the optical axes of the objective lens unit (12a, 12b) are illustrated coaxially with the optical axes of the eyepiece (16a, 16b), as is the case in a relatively small binocular 2. The invention can also be applied to binocular 2 which, as illustrated in FIG. 1 and is customary in a relatively large binocular, has an offset of the optical axes of the eyepiece and of the objective lens unit.

The objective lens unit (12a, 12b), in the embodiment shown here, includes two fixed objective lenses (32a, 34a, 32b, 34b) and the eyepiece (16a, 16b) includes three eyepiece lenses (36a, 38a, 40a, 36b, 38b, 40b). The diopter compensation can take place, for example, via an axial displacement at one of the two eyepieces (16a, 16b).

The focusing lens (20a, 20b) can be displaced axially along the optical axis or the central axis A, which is parallel thereto, in order to bring about the focusing of the two telescopes (6a, 6b). In the present embodiment, the longitudinal displacement of the focusing lens (20a, 20b) takes place via a spindle drive (42a, 42b), including a spindle (44a, 44b) which is embodied as a threaded rod and which interacts with a linear displacement device (46a, 46b) with a complementary thread on the part of the left-hand and right-hand optics (in this embodiment, the respective focusing lens (20a, 20b)) which are each of axially displaceable design for the purpose of synchronous focusing, such that the rotation of the spindle (44a, 44b) brings about a linear axial displacement of the part of the optics (in this embodiment, the respective focusing lens (20a, 20b) which is of axially displaceable design on each side. This avoids complex pushrod systems or lever systems with unfavorable lever ratios which are used to a certain extent in the prior art.

A typical axial linear adjustment travel of the focusing lens (20a, 20b) is of the order of magnitude of approximately 10 mm here. The rotary drive of the spindles (44a, 44b) is provided via the focusing gear mechanism 48 which is embodied as a gearwheel mechanism and can be seen best in FIGS. 4 to 6.

Figure 4:
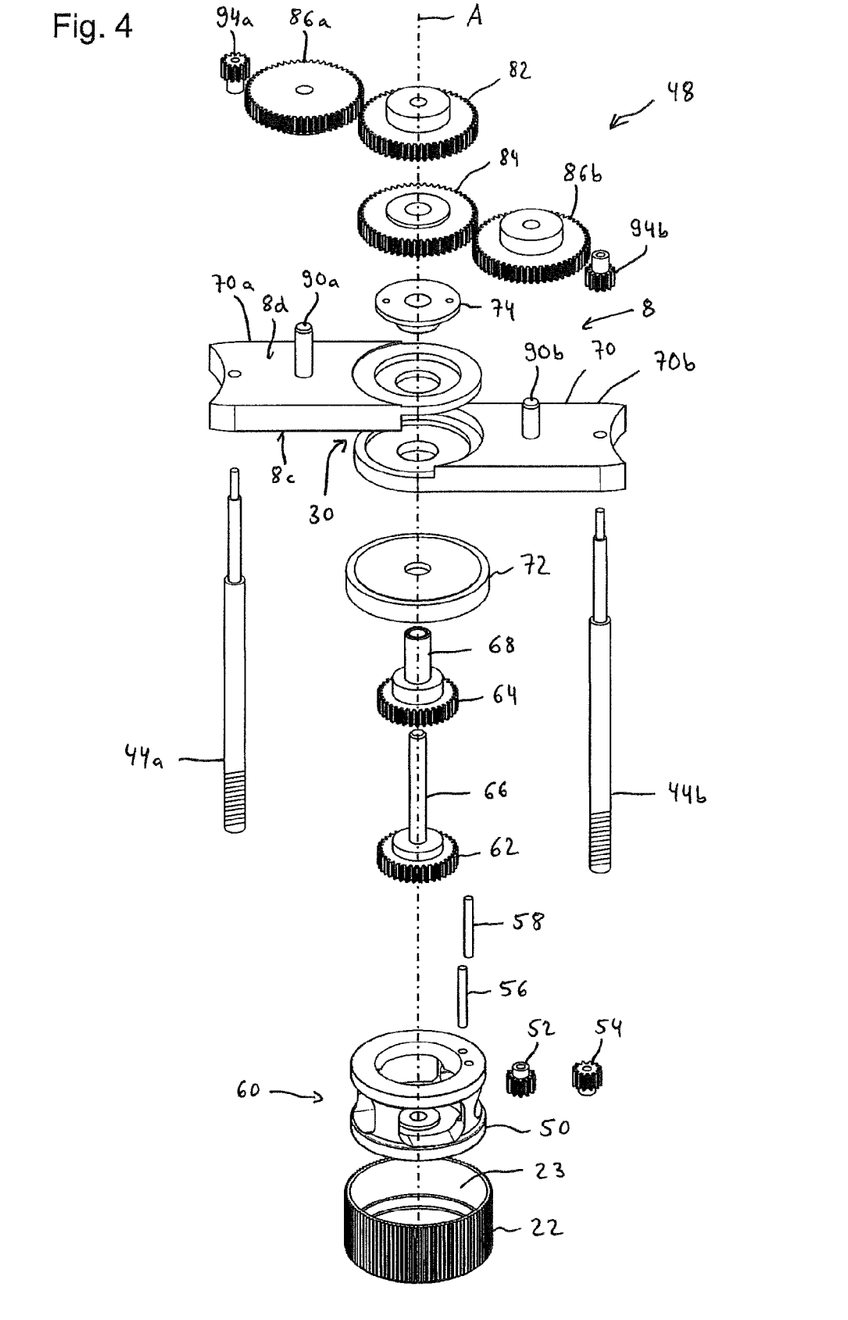
FIG. 4 shows an exploded view of the focusing drive of the binocular of FIGS. 2 and 3.
Figure 5:
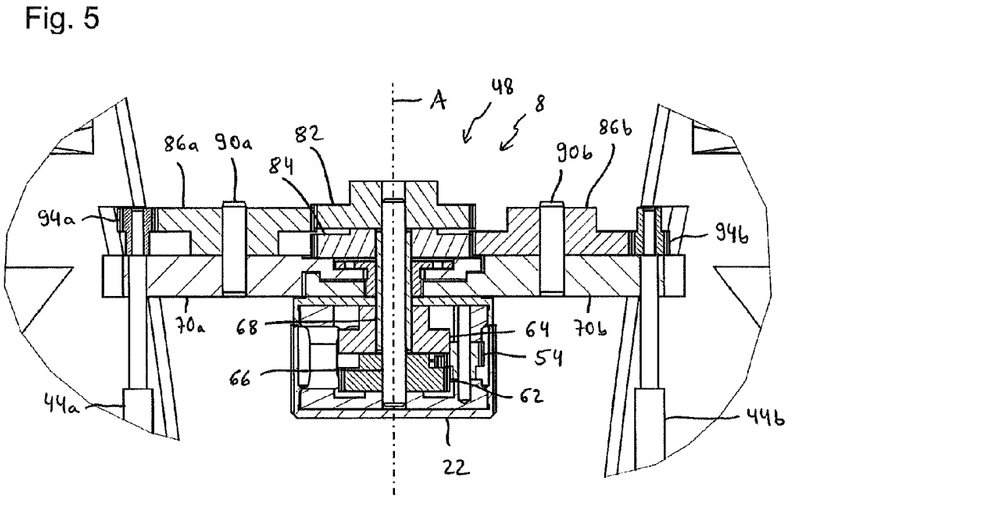
FIG. 5 shows an enlargement of a detail of the joint and differential drive of FIG. 3.
Figure 6:
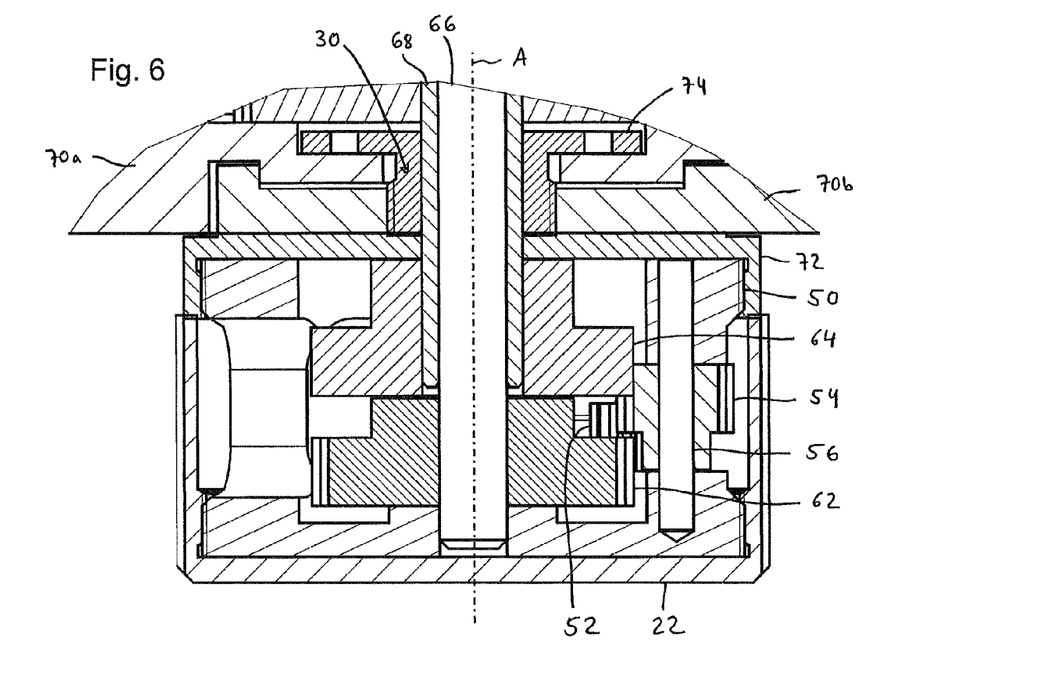
FIG. 6 shows a further enlarged detail of FIG. 5.
Figure 7:
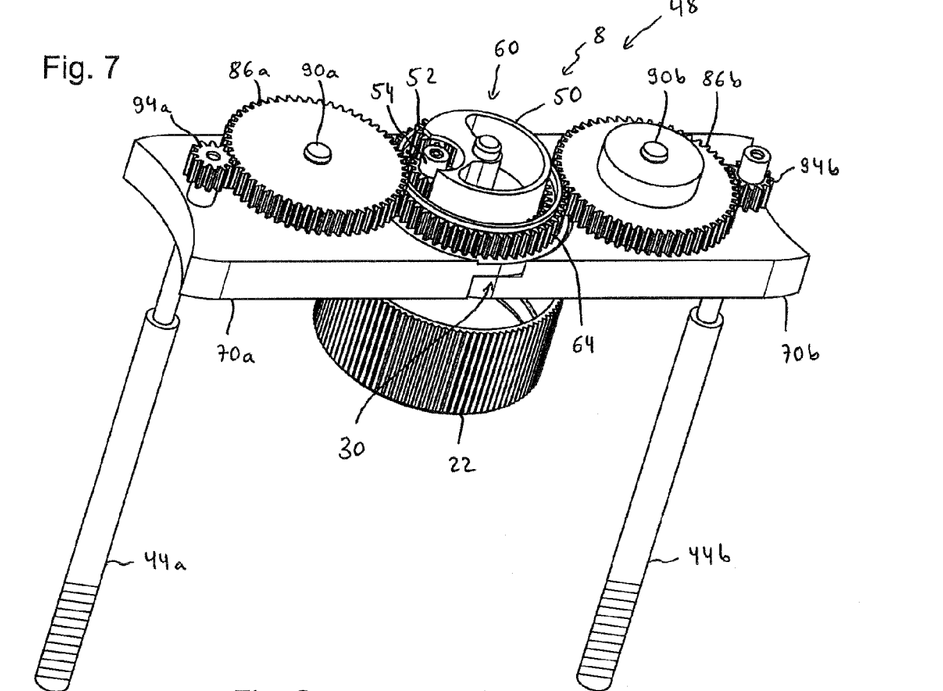
FIG. 7 shows a three-dimensional illustration of the focusing gear mechanism of a binocular according to a second exemplary embodiment of the invention.
Figure 8:
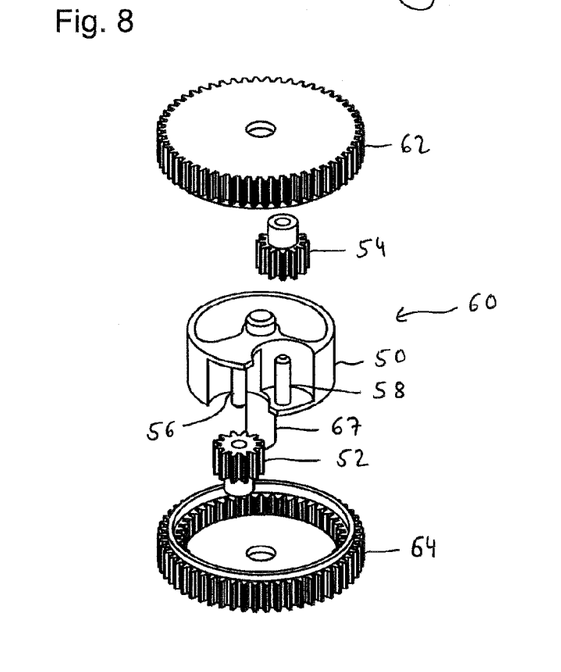
FIG. 8 shows an exploded illustration of the differential gear assembly of FIG. 7.
Figure 9:
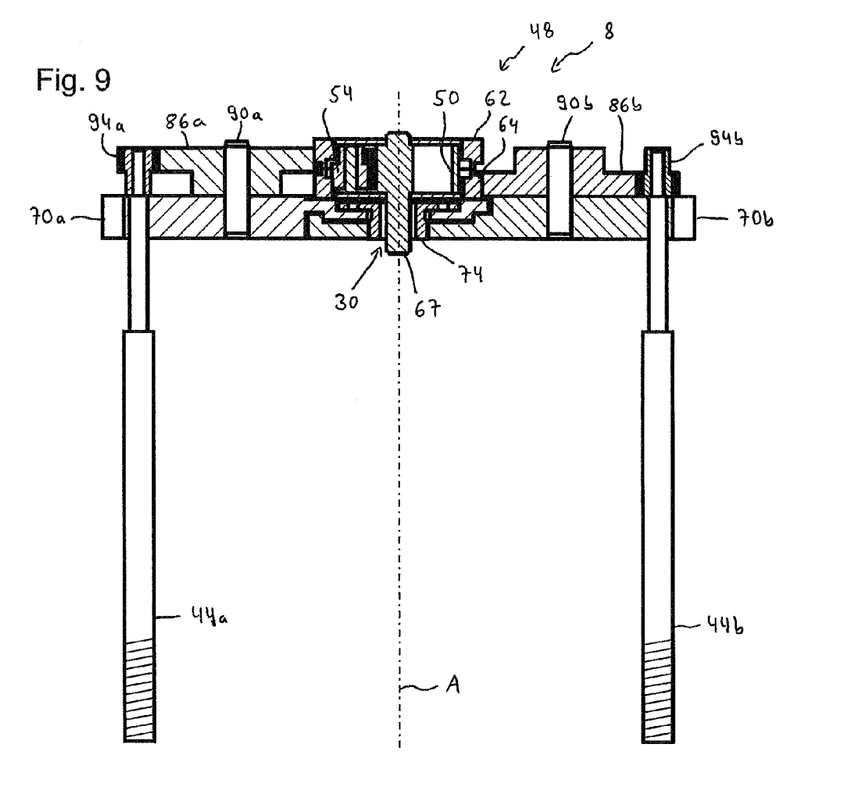
FIG. 9 shows a cross section through the focusing gear mechanism of FIG. 7; and, FIG. 10 shows an enlargement of a detail from FIG. 9.
Figure 10:
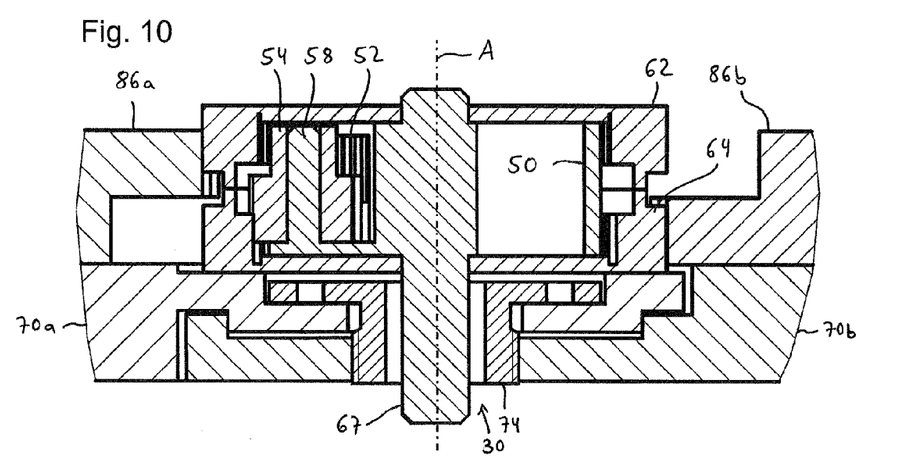

The user drives the rotary knob 22 via manual rotation. The rotary knob 22 is of hollow design in the manner of a hat. Arranged in the interior space 23 of the rotary knob 22 is a differential gear assembly cage 50 which is connected in a rotationally fixed fashion to the rotary knob 22, with the result that rotating the rotary knob 22 causes the differential gear assembly cage 50 to rotate. The differential gear assembly cage 50 houses two rotating gearwheels (52, 54) which are secured in rotatable fashion with axle bolts (56, 58) in the differential gear assembly cage 50 such that they are made to move by the differential gear assembly cage 50 in a circulating fashion about the central axis A which is coaxial with respect to the joint 30. The rotating gearwheels (52, 54) mesh with corresponding ones of coaxially central sun gearwheels (62, 64) and roll thereon, as a result of which the sun gearwheels (62, 64) are made to rotate. The sun gearwheel 64, which faces away from the rotary knob, has a hollow shaft 68 in which the shaft 66 of the sun gearwheel 62, which faces the rotary knob 22, extends coaxially.

The folding bridge 8 includes a cross-plate 70 which is made of a left-hand and right-hand half (70a, 70b) which form, with central joint elements (72, 74), the pivoting or folding joint 30 of the folding bridge 8. As a result, the two halves (70a, 70b) of the cross-plate 70 from which the two tubes (4a, 4b) are in turn suspended are mounted so as to be pivotable or foldable about the central axis A.

The joint 30 is embodied in the present embodiment as a hollow joint, with the result that the two shafts (66, 68) of the two sun gearwheels (62, 64) can extend coaxially through the joint 30. In this example, the differential gear assembly 60, embodied as a differential gearwheel mechanism, is arranged on the objective lens unit side 8c of the folding bridge 8 and further parts of the focusing gear mechanism 48 are arranged on the eyepiece side 8d of the folding bridge 8. Two coaxial central intermediate gearwheels (82, 84) are connected in a rotationally fixed fashion on the eyepiece side 8d to the output shafts (66, 68) of the sun gearwheels (62, 64). The coaxial central intermediate gearwheels (82, 84) mesh with corresponding ones of laterally offset transfer gearwheels (86a, 86b) which are mounted on respective shaft pins (90a, 90b) of corresponding ones of the cross-plate halves (70a, 70b). The laterally offset transfer gearwheels (86a, 86b) are in turn in meshing engagement with small outer gearwheels (94a, 94b), with the result that a downstep gear mechanism is provided. In the present embodiment, the gear ratio is approximately 4.5:1.

The outer gearwheels (94a, 94b) are fixedly connected in to the spindles (44a, 44b) so as to rotate therewith. This has the result that in this way the spindles (44a, 44b) are driven in rotation, specifically synchronously by rotating the single rotary knob 22 via the focusing gear mechanism 48 described above. As best shown in FIG. 3, the rotation of the spindles (44a, 44b) is then converted into the desired axial linear displacement for respective telescopes (6a, 6b), each first separately on the axially displaceably embodied part of the optics (in this embodiment at the focusing lens (20a, 20b)). The use of respectively separate spindle drives (42a, 42b) for respective telescopes (6a, 6b) has proven reliable and low in play. The self-locking of the two spindle drives (42a, 42b) can be set large enough that the differential gear assembly 60 reliably drives both focusing lenses (20a, 20b) synchronously when the rotary knob 22 rotates. Depending on the design of the binocular 2, the spindle drive (42a, 42b) which is synchronous on both sides and is driven via the differential gear assembly 60, can also displace in axially linear fashion another element of the optics which is of axially displaceable design, for example another lens which is associated with the objective lens unit (12a, 12b).

In summary, the drive or focusing wheel 22 which is embodied as a rotary knob contains the differential gear assembly cage 50, which in turn contains the two rotating or planetary gearwheels (52, 54) which run in opposite directions. If the user rotates the rotary knob 22 and therefore rotates the differential gear assembly cage 50, the rotating gearwheels (52, 54) which run in opposite directions are themselves blocked and transmit the rotational movement to the two sun gearwheels (62, 64), which each transmit the rotation synchronously to the two spindles (44a, 44b), embodied as threaded rods, via the central intermediate gearwheels (82, 84) and the downstep gear mechanism (86a, 86b, 94a, 94b). This principle functions as long as the torques are approximately the same. If the folding bridge 8 is folded in order to change the distance $d_0$ between the eyepieces, the two rotating gearwheels (52, 54) roll on the sun gearwheels (62, 64) and in this way compensate the circumferential differences of the gearwheels. The focusing drive of the present invention therefore transmits the drive initiated by the user via the rotary knob 22 as far as the left-hand and right-hand spindles (44a, 44b) via gearwheels through rotation, with the result that unfavorable lever ratios and risks of jamming of complex push rod systems or lever systems can be avoided.

FIGS. 7 to 10 show a second embodiment of a planetary differential gear assembly 60. In this embodiment, the rotary knob 22 is also arranged on the objective lens unit side and transmits the rotational movement via a shaft 67 which extends coaxially through the joint 30, to the differential gear assembly cage 50 which in this embodiment is arranged downstream of the latter on the side 8d of the folding bridge 8 which is opposite the rotary knob 22 (in this example on the eyepiece side). The differential gear assembly 60 includes two sun gearwheels (62, 64) which have internal and external toothing and whose internal toothing is in meshing engagement with the planetary or rotating gearwheels (52, 54). The rotating gearwheels (52, 54) are entrained about the central axis A by the differential gear assembly cage 50 via axle bolts (56, 58), and in this way drive the two sun gearwheels (62, 64) on the eyepiece side 8d of the folding bridge 8. In this exemplary embodiment, the two sun gearwheels (62, 64) are then each in direct meshing engagement with the laterally and axially offset transfer gearwheels (86a, 86b), which are in turn in meshing engagement with the outer gearwheels (94a, 94b) which are attached to the spindles (44a, 44b). In certain embodiments of binocular 2 this gear mechanism can, if appropriate, be of even more compact configuration than that in FIGS. 2 to 6, in particular the separate coaxial intermediate gearwheels (82, 84) are dispensed with or are replaced by the sun gearwheels (62, 64) with internal and external toothing.

In both exemplary embodiments, the spindles (44a, 44b) are rotatably mounted in the cross-plate 70, that is, in corresponding ones of halves (70a, 70b) of the cross-plate 70, specifically laterally offset on each side of the central axis A of the joint 30. In the shown embodiment, the spindles (44a, 44b) extend within the associated telescope housing (4a, 4b).

In both exemplary embodiments, the differential gear assembly 60 is embodied as a spur-gear planetary differential gear assembly, which permits a compact design. The frictional torques of the spindles (44a, 44b) and the frictional torques of the gear mechanism are set in such a way that the frictional torques of the spindles (44a, 44b) are larger than the frictional torques of the differential gear assembly 60, with the result that the spindles (44a, 44b) do not rotate during the pivoting or folding of the folding bridge 8 but instead the rotating gearwheels (52, 54) roll on the sun gearwheels (62, 64) so that the focusing is not unintentionally adjusted when the folding bridge 8 folds.

In order to be able to ensure the corresponding frictional values within the focusing gear mechanism 48, in the first embodiment in FIGS. 4 to 6 it is possible to arrange another friction disc (not shown) between the two coaxial intermediate gearwheels (82, 84).

The described forms of gear mechanism advantageously have a flat design and can therefore be arranged even in binocular 2 with what is referred to as a reach through, that is, with a freely accessible rotary knob 22 between the two housing halves or tubes (4a, 4b), in particular in the case of an objective-lens-unit-side rotary knob 22 as in the exemplary embodiments here. In addition, it is advantageous that the gear mechanism which has a flat design can even be integrated in a flat folding bridge 8, which also permits a low-play embodiment there.

In summary, the focusing gear mechanism 48 includes a first common central part 50-84, which is embodied as a gear mechanism, and a second part (86a, 86b, 94a, 94b), which is also embodied as a gear mechanism, wherein the second part (86a, 86b, 94a, 94b) is divided into a first half (86a, 94a) and a second half (86b, 94b) which is assigned to the left-hand and right-hand telescopes (6a, 6b). Stated otherwise, the focusing drive is divided between the two telescopes (6a, 6b), even within the gear mechanism 50-94b. The rotary drive which is applied via the rotary knob 22 is therefore divided, via the differential gear assembly 60, between the left-hand half (86a, 94a) and the right-hand half (86b, 94b) of the second part of the gear mechanism and is transmitted from the latter as far as the correspondingly associated left-hand or right-hand spindle drive (42a, 42b) in a separately rotational fashion for each half.

The present invention therefore permits an advantageous combination of the central drive for the focusing and a rotary drive which extends as far as possible to the part of the optics which focus synchronously through axial linear displacement, via gearwheels.

It is understood that the foregoing description is that of the preferred embodiments of the invention and that various changes and modifications may be made thereto without departing from the spirit and scope of the invention as defined in the appended claims.

LIST OF REFERENCE NUMERALS

2 Binocular
4a, 4b Housing halves
6a, 6b Left-hand and right-hand telescopes
8 Folding bridge
8c Objective lens unit side of the folding bridge
8d Eyepiece side of the folding bridge
10a, 10b Optical systems
12a, 12b Objective lens units
13a, 13b Field diaphragms
14a, 14b Prism systems
16a, 16b Eyepieces 18 Object
20a, 20b Focusing lenses
22 Rotary knob
23 Interior space
24a, 24b Eyes
25a, 25b Pupils of the eyes
26a, 26b Optical axes of the objective lens units
28a, 28b Optical axes of the eyepieces
30 Joint
32a, 32b Fixed objective lenses
34a, 34b Fixed objective lenses
36a, 36b Eyepiece lenses
38a, 38b Eyepiece lenses
40a, 40b Eyepiece lenses
42a, 42b Spindle drives
44a, 44b Spindles
46a, 46b Linear displacement devices
48 Focusing gear mechanism
50 Differential gear assembly cage
52, 54 Rotating gearwheels
56, 58 Axle bolts
60 Differential gear assembly
62, 64 Sun gearwheels
66, 67, 68 Shafts
70 Cross-plate
70a, 70b Cross-plate halves
72, 74 Central joint elements
82, 84 Coaxial central intermediate gearwheels
86a, 86b transfer gearwheels
90a, 90b Axle bolts
94a, 94b External gearwheels

What is claimed is:

1. A binocular for the left and right eye of a user having an interpupillary distance (W) between the left and right eye, the binocular comprising:
a left telescope having first optical elements with adjustable focusing for the left eye of the user;
a right telescope having second optical elements with adjustable focusing for the right eye of the user;
a folding bridge having a joint pivotally interconnecting said left telescope and said right telescope so as to cause a pivot movement of said folding bridge to adapt the distance between said left telescope and said right telescope to said interpupillary distance (W) of the user;
a focusing gear mechanism configured to synchronously focus said left telescope and said right telescope;
a common focusing drive element configured to be operated by the user to drive a focusing of said left telescope and said right telescope via said focusing gear mechanism; and,
said focusing gear mechanism including a differential gear assembly distributing the driving, brought about by the user via the common focusing drive element, to said left telescope and said right telescope for the synchronously focusing of said left telescope and said right telescope via said differential gear assembly.

2. The binocular of claim 1, wherein said common focusing drive element is configured as a manually operated rotary knob configured to drive said differential gear assembly directly or indirectly.

3. The binocular of claim 1, wherein:
said joint of said folding bridge defines a pivot axis (A);
said common focusing drive element defines a rotational axis;
said common focusing drive element is arranged on said folding bridge between said left telescope and said right telescope so as to cause said rotational axis to extend coaxially with said pivot axis (A).

4. The binocular of claim 1, wherein:
said differential gear assembly is configured as a planetary gear wheel mechanism including a first and a second rotating gear wheel and a first and a second sun gear wheel;
said first sun gear wheel is in meshing engagement with said first rotating gear wheel;
said second sun gear wheel is in meshing engagement with said second rotating gear wheel;
said first rotating gear wheel and said second rotating gear wheel are configured to be driven by said common focusing drive element;
said first sun gear wheel is configured to have an output to drive the focusing of said left telescope; and,
said second gear wheel is configured to have an output to drive the focusing of said right telescope.

5. The binocular of claim 4, wherein said first and second sun gear wheels are arranged at least one of coaxially to said joint and coaxially to each other.

6. The binocular of claim 1, wherein:
said folding bridge includes a transverse plate mutually connecting said left telescope and said right telescope;
said transverse plate is configured in two parts including a left half and a right half; and,
said left half and said right half of said transverse plate are pivotally interconnected via said joint.

7. The binocular of claim 1, wherein:
said differential gear assembly is arranged on said joint;
said joint includes a hollow shaft; and,
said focusing gear mechanism includes a first shaft configured to extend coaxially through said hollow shaft.

8. The binocular of claim 1 further comprising:
a left spindle drive configured to be rotatably driven by said focusing gear mechanism to effect a focusing of said left telescope;
a right spindle drive configured to be rotatably driven by said focusing gear mechanism to effect a focusing of said right telescope;
said left spindle drive being configured to convert a rotational movement of said left spindle drive into a linear displacement of at least one of said first optical elements of said left telescope; and,
said right spindle drive being configured to convert a rotational movement of said right spindle drive into a linear displacement of at least one of said second optical elements of said right telescope.

9. The binocular of claim 8 further comprising:
a housing having a left housing half accommodating said left telescope and a right housing half accommodating said right telescope;
said left spindle drive including a left spindle extending in said left housing half;
said right spindle drive including a right spindle extending in said right housing half;
said folding bridge including a transverse plate connecting said left telescope and said right telescope;
said transverse plate being configured in two parts including a left half and a right half;
said left half and said right half of said transverse plate being pivotally interconnected via said joint;
said left spindle being rotatably mounted on said left half of said transverse plate; and,
said right spindle being rotatably mounted on said right half of said transverse plate.

10. The binocular of claim 9, wherein:
said focusing gear mechanism includes a first and a second reduction gear unit;
said differential gear assembly has a first output configured to drive said first reduction gear unit and a second output configured to drive said second reduction gear unit;
said left spindle drive is configured to be driven via said first reduction gear unit; and,
said right spindle drive is configured to be driven via said second reduction gear unit.

11. A binocular for the left and right eye of a user having an interpupillary distance (W) between the left and right eye, the binocular comprising:
a left telescope having first optical elements with adjustable focusing for the left eye of the user;
a right telescope having second optical elements with adjustable focusing for the right eye of the user;
a folding bridge having a joint pivotally interconnecting said left telescope and said right telescope so as to cause a pivot movement of said folding bridge to adapt the distance between said left telescope and said right telescope to said interpupillary distance (W) of the user;
a focusing gear mechanism configured to synchronously focus said left telescope and said right telescope;
a common focusing drive element configured to be operated by the user to drive a focusing of said left telescope and said right telescope via said focusing gear mechanism;
said focusing gear mechanism including a differential gear assembly;
a left spindle drive configured to be rotatably driven by said focusing gear mechanism to effect a focusing of said left telescope;
a right spindle drive configured to be rotatably driven by said focusing gear mechanism to effect a focusing of said right telescope;
said left spindle drive being configured to convert a rotational movement of said left spindle drive into a linear displacement of at least one of said first optical elements of said left telescope;
said right spindle drive being configured to convert a rotational movement of said right spindle drive into a linear displacement of at least one of said second optical elements of said right telescope;
a housing having a left housing half accommodating said left telescope and a right housing half accommodating said right telescope;
said left spindle drive including a left spindle extending in said left housing half;
said right spindle drive including a right spindle extending in said right housing half;
said folding bridge including a transverse plate connecting said left telescope and said right telescope;
said transverse plate being configured in two parts including a left half and a right half;
said left half and said right half of said transverse plate being pivotally interconnected via said joint;
said left spindle being rotatably mounted on said left half of said transverse plate;
said right spindle being rotatably mounted on said right half of said transverse plate;
said focusing gear mechanism includes a first and a second reduction gear unit;
said differential gear assembly has a first output configured to drive said first reduction gear unit and a second output configured to drive said second reduction gear unit;
said left spindle drive is configured to be driven via said first reduction gear unit;
said right spindle drive is configured to be driven via said second reduction gear unit;
said folding bridge has a first side and a second side disposed axially opposite to said first side;
said common focusing drive element and said differential gear assembly are arranged on said first side of said folding bridge; and,
said first and second reduction gear units are arranged on said second side of said folding bridge.

12. A binocular for the left and right eye of a user having an interpupillary distance (W) between the left and right eye, the binocular comprising:
a left telescope having first optical elements with adjustable focusing for the left eye of the user;
a right telescope having second optical elements with adjustable focusing for the right eye of the user;
a folding bridge having a joint pivotally interconnecting said left telescope and said right telescope so as to cause a pivot movement of said folding bridge to adapt the distance between said left telescope and said right telescope to said interpupillary distance (W) of the user;
a focusing gear mechanism configured to synchronously focus said left telescope and said right telescope;
a common focusing drive element configured to be operated by the user to drive a focusing of said left telescope and said right telescope via said focusing gear mechanism;
said focusing gear mechanism including a differential gear assembly;
said folding bridge has a first side and a second side disposed axially opposite to said first side; and,
said common focusing drive element and said differential gear assembly are arranged on said first side of said folding bridge.

13. A binocular for the left and right eye of a user having an interpupillary distance (W) between the left and right eye, the binocular comprising:
a left telescope having first optical elements with adjustable focusing for the left eye of the user;
a right telescope having second optical elements with adjustable focusing for the right eye of the user;
a folding bridge having a joint pivotally interconnecting said left telescope and said right telescope so as to cause a pivot movement of said folding bridge to adapt the distance between said left telescope and said right telescope to said interpupillary distance (W) of the user;
a focusing gear mechanism configured to synchronously focus said left telescope and said right telescope;
a common focusing drive element configured to be operated by the user to drive a focusing of said left telescope and said right telescope via said focusing gear mechanism;
said focusing gear mechanism including a differential gear assembly;
a left spindle drive configured to be rotatably driven by said focusing gear mechanism to effect a focusing of said left telescope;

a right spindle drive configured to be rotatably driven by said focusing gear mechanism to effect a focusing of said right telescope;
said left spindle drive being configured to convert a rotational movement of said left spindle drive into a linear displacement of at least one of said first optical elements of said left telescope;
said right spindle drive being configured to convert a rotational movement of said right spindle drive into a linear displacement of at least one of said second optical elements of said right telescope;
a housing having a left housing half accommodating said left telescope and a right housing half accommodating said right telescope;
said left spindle drive including a left spindle extending in said left housing half;
said right spindle drive including a right spindle extending in said right housing half;
said folding bridge including a transverse plate connecting said left telescope and said right telescope;
said transverse plate being configured in two parts including a left half and a right half;
said left half and said right half of said transverse plate being pivotally interconnected via said joint;
said left spindle being rotatably mounted on said left half of said transverse plate;
said right spindle being rotatably mounted on said right half of said transverse plate;
said focusing gear mechanism includes a first and a second reduction gear unit;
said differential gear assembly has a first output configured to drive said first reduction gear unit and a second output configured to drive said second reduction gear unit;
said left spindle drive is configured to be driven via said first reduction gear unit;
said right spindle drive is configured to be driven via said second reduction gear unit;
said folding bridge has a first side and a second side disposed axially opposite to said first side; and,
said first and second reduction gear units are arranged on said second side of said folding bridge.

14. The binocular of claim 4, wherein:
said first sun gear wheel has a first output shaft;
said second sun gear wheel has a second output shaft;
said joint of said folding bridge defines a pivot axis (A); and,
at least one of said first output shaft and said second output shaft extends coaxially with said pivot axis W.

15. The binocular of claim 14, wherein:
said first output shaft and said second output shaft extend axially in the same direction;
a first one of said first output shaft and said second output shaft is configured as a hollow shaft; and,
the second one of said first output shaft and said second output shaft extends coaxially in said hollow shaft.

16. The binocular of claim 1, wherein:
said differential gear assembly includes a differential gear assembly cage; and,
said focusing drive element accommodates said differential gear assembly cage.

* * * * *